(12) United States Patent
Cheng et al.

(10) Patent No.: US 10,608,957 B2
(45) Date of Patent: Mar. 31, 2020

(54) METHOD AND APPARATUS TO OPTIMIZE MULTI-DESTINATION TRAFFIC OVER ETHERCHANNEL IN STACKWISE VIRTUAL TOPOLOGY

(71) Applicant: Cisco Technology, Inc., San Jose, CA (US)

(72) Inventors: Linda T. Cheng, San Jose, CA (US); Manpreet Singh Sandhu, San Jose, CA (US); Subrat Mohanty, Los Gatos, CA (US); Ali Ahmad Tareen, Milpitas, CA (US); Ganesh Srinivasa Bhat, Union City, CA (US)

(73) Assignee: Cisco Technology, Inc., San Jose, CA (US)

(*) Notice: Subject to any disclaimer, the term of this patent is extended or adjusted under 35 U.S.C. 154(b) by 134 days.

(21) Appl. No.: 15/636,933

(22) Filed: Jun. 29, 2017

(65) Prior Publication Data
US 2019/0007343 A1    Jan. 3, 2019

(51) Int. Cl.
*H04L 12/935* (2013.01)
*H04L 12/933* (2013.01)
*H04L 12/741* (2013.01)
*H04L 12/931* (2013.01)

(52) U.S. Cl.
CPC .......... *H04L 49/3063* (2013.01); *H04L 45/74* (2013.01); *H04L 49/10* (2013.01); *H04L 49/3009* (2013.01); *H04L 49/602* (2013.01); *H04L 49/70* (2013.01)

(58) Field of Classification Search
CPC ......... H04L 49/10; H04L 45/74; H04L 49/70; H04L 49/602; H04L 49/3009; H04L 49/3063
See application file for complete search history.

(56) References Cited

U.S. PATENT DOCUMENTS

| | | | |
|---|---|---|---|
| 7,274,694 B1 * | 9/2007 | Cheng | H04L 45/245 370/389 |
| 2003/0140124 A1 * | 7/2003 | Burns | H04L 45/00 709/220 |
| 2005/0068993 A1 * | 3/2005 | Russell | H04J 3/1617 370/537 |
| 2007/0207591 A1 * | 9/2007 | Rahman | H04L 45/00 438/439 |

(Continued)

OTHER PUBLICATIONS

IP.com search in NPL; Jul. 2019 (Year: 2019).*

(Continued)

*Primary Examiner* — Benjamin H Elliott, IV
(74) *Attorney, Agent, or Firm* — Merchant & Gould P.C.

(57) ABSTRACT

Methods and systems are disclosed. The method comprises: designating a first plurality of links from a first stack segment to a second stack segment as a first etherchannel link; designating a second plurality of links from the first stack segment to a third stack segment as a second etherchannel link, where the second stack segment and the third stack segment are in communication with a fourth stack segment; designating the first etherchannel link and the second etherchannel link as members of a hierarchical etherchannel link; and sending a packet from the first stack segment to the fourth stack segment using the hierarchical etherchannel link.

18 Claims, 8 Drawing Sheets

(56) References Cited

U.S. PATENT DOCUMENTS

| | | | |
|---|---|---|---|
| 2008/0259951 A1* | 10/2008 | Cardona | H04L 41/0668 370/465 |
| 2010/0146323 A1* | 6/2010 | Hu | H04L 45/28 714/2 |
| 2012/0198270 A1* | 8/2012 | Jain | H04L 1/22 714/4.11 |
| 2012/0307641 A1* | 12/2012 | Arumilli | H04L 47/125 370/241 |
| 2014/0025736 A1* | 1/2014 | Wang | H04L 45/46 709/204 |
| 2015/0188806 A1* | 7/2015 | Anumala | H04L 45/48 370/254 |
| 2015/0195218 A1* | 7/2015 | Smith | H04L 45/02 370/420 |
| 2016/0301597 A1* | 10/2016 | Jayakumar | H04L 45/245 |
| 2018/0359811 A1* | 12/2018 | Verzun | H04L 12/28 |
| 2019/0007262 A1* | 1/2019 | Cheng | H04L 41/0803 |
| 2019/0007302 A1* | 1/2019 | Cheng | H04L 43/10 |
| 2019/0007343 A1* | 1/2019 | Cheng | H04L 49/3063 |

OTHER PUBLICATIONS

IP.com search in Patents; Jul. 2019 (Year: 2019).*
U.S. Appl. No. 15/637,034, filed Jun. 29, 2017, title: "Mechanism for Dual Active Detection Link Monitoring in Virtual Switching System with Hardware Accelerated Fast Hello".
U.S. Appl. No. 15/637,146, filed Jun. 29, 2017, title: "Systems and Methods for Enabling Frontside Stacking of Switches".

* cited by examiner

METHOD AND APPARATUS TO OPTIMIZE MULTI-DESTINATION TRAFFIC OVER ETHERCHANNEL IN STACKWISE VIRTUAL TOPOLOGY

TECHNICAL FIELD

This disclosure relates in general to optimization of traffic flow over etherchannel in multiple topologies.

BACKGROUND

Switches comprise backside ports and frontside ports. Backside ports are used to, for example, connect one switch to another switch to form a switch stack, or a stacked switch. Backside ports typically have a maximum link distance of five meters or less, but communicate at a very high speed. Frontside ports are ports used to typically attach devices to the switch. The advantage of frontside Ethernet ports is that they can connect devices over long distances, but at a speed slower than the connection speeds of backside ports.

In the past, switches that were spaced far apart could be connected together in a ring using two of the frontside ports. As only two frontside ports were available for frontside stacking, ring topologies have been the only topologies available, making mesh and other interesting configurations impossible. In addition, prior switches could not support hierarchical etherchannel communications, such as that which may be implemented in "ring of rings" topologies. Furthermore, in hierarchical topologies that implement multiple levels of stacks between access nodes and a core node, there have not been methods to efficiently load balance the traffic or avoid traffic flowing over unnecessary links. In addition, prior systems failed to perform déjà vu checks based on global port numbers and intermediate port numbers.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Methods and systems are disclosed. The method includes: designating a first plurality of links from a first stack segment to a second stack segment as a first etherchannel link; designating a second plurality of links from the first stack segment to a third stack segment as a second etherchannel link, where the second stack segment and the third stack segment are in communication with a fourth stack segment; designating the first etherchannel link and the second etherchannel link as members of a hierarchical etherchannel link; and sending a packet from the first stack segment to the fourth stack segment using the hierarchical etherchannel link.

Additional embodiments include a method of transmitting a packet via a plurality of stack segments, including: receiving a native Ethernet packet; appending a source global port number to a header on the packet; transmitting the packet and the header from a first stack segment to a second stack segment; and performing a déjà vu on the source global port number at the second stack segment.

Also disclosed is a method of communicating between an access node and a core node via an aggregation node, including: hashing a packet at the access node to select a link within an etherchannel upon which to transmit the packet to the aggregation node; and hashing a packet at the aggregation node to select a link within a second etherchannel upon which to transmit the packet to the core node.

Example Embodiments

Figure 1:
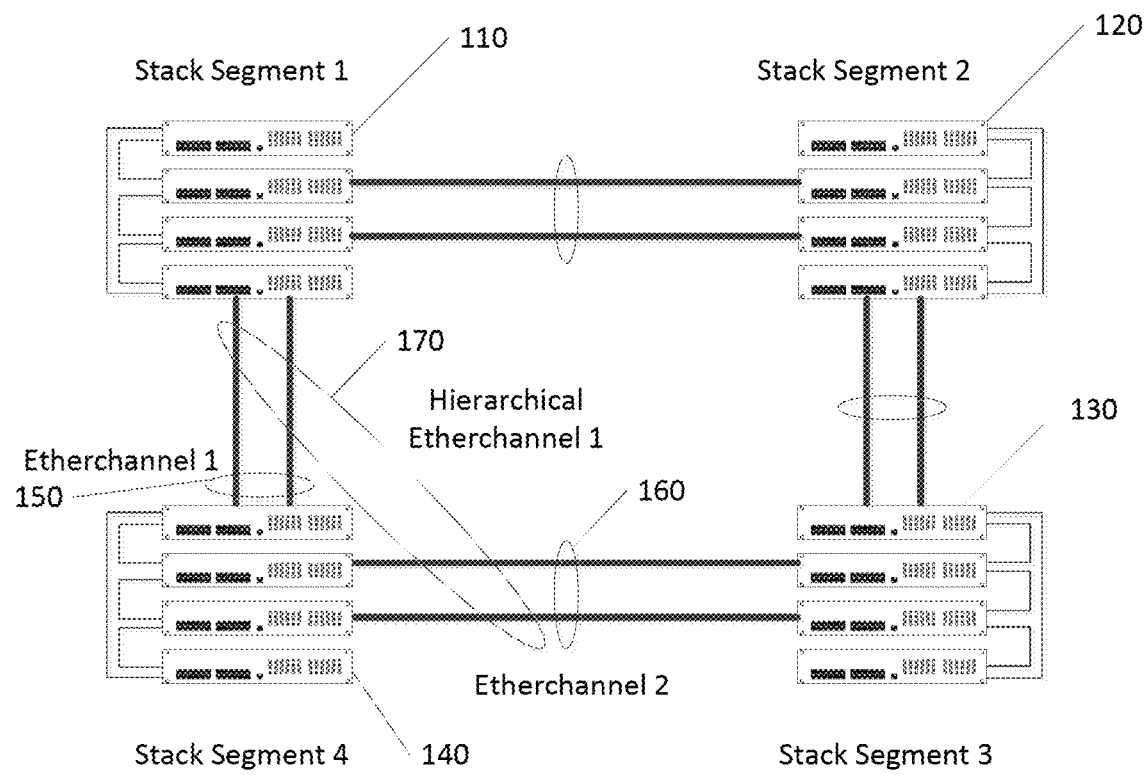
FIG. 1 illustrates an exemplary switch topology of a "ring of rings" type that uses hierarchical etherchannel consistent with embodiments of the present disclosure.

In a "ring of rings," or "stack of stack" topology such as that shown in FIG. 1, traffic flows destined from a first stack segment (which in itself has a full ring backstack) to a second stack segment separated by one or more additional stack segments needs to be distributed to two Stackwise Virtual Links (one on each side of the first stack segment). Each Stackwise Virtual Link is treated as a stack port etherchannel group and as long as the etherchannel is alive, packets continue to flow in the respective directions.

But in the case of a Stackwise Virtual Link being down completely, there is a need to redistribute its traffic to the other segment. This traffic convergence, where the system is redirecting the forwarding plane traffic can be solved by using Hierarchical Etherchannels (HEC).

In HEC, Stackwise Virtual Links from the first stack segment to a first intermediate stack segment are part of etherchannel 1. Similarly Stackwise Virtual Links from the first stack segment to a second intermediate stack segment are part of etherchannel 2. Etherchannel 1 and etherchannel 2 are members of a hierarchical etherchannel group, thus vastly improving traffic convergence by doing convergence in the forwarding ASIC.

For the first phase of implementation the traffic redirection may be managed by software tables as currently there may not be support for Hierarchical Etherchannel tables in prior hardware. Should etherchannel 2 be broken, the software will walk through the forwarding tables and modify required forwarding entries where the software will remove etherchannel 2 as a destination and add etherchannel 1 as the alternative destination. With hardware/ASIC support to handle Hierarchical Etherchannel ("EC") tables, where both EC destination indices can be added as part of a Hierarchical EC table, on a complete EC bundle going down, hierarchical load balancing will kick in and traffic will be redirected to the other alternate etherchannel. Software forwarding entries will continue to point to the HEC Table forwarding entry.

By making etherchannel ports members of a Hierarchical Etherchannel group, the ability to converge data traffic in a stack of stacks topology is significantly improved.

Additional features of the present disclosure include the ability to load balance traffic that flows between a core, an aggregation layer, and an access. When traffic flows from access to core via an aggregation layer, the traffic from access will hash and arrive via any EC member connected to the aggregation. From the aggregation to the core, traffic can again hash out from any EC member connected to the core.

When traffic flows from the core to the aggregation layer to access, traffic from the core will hash and arrive via any EC member connected to the aggregation. From the aggregation to the access, traffic can again hash out from any EC member connected to the access.

Figure 3:
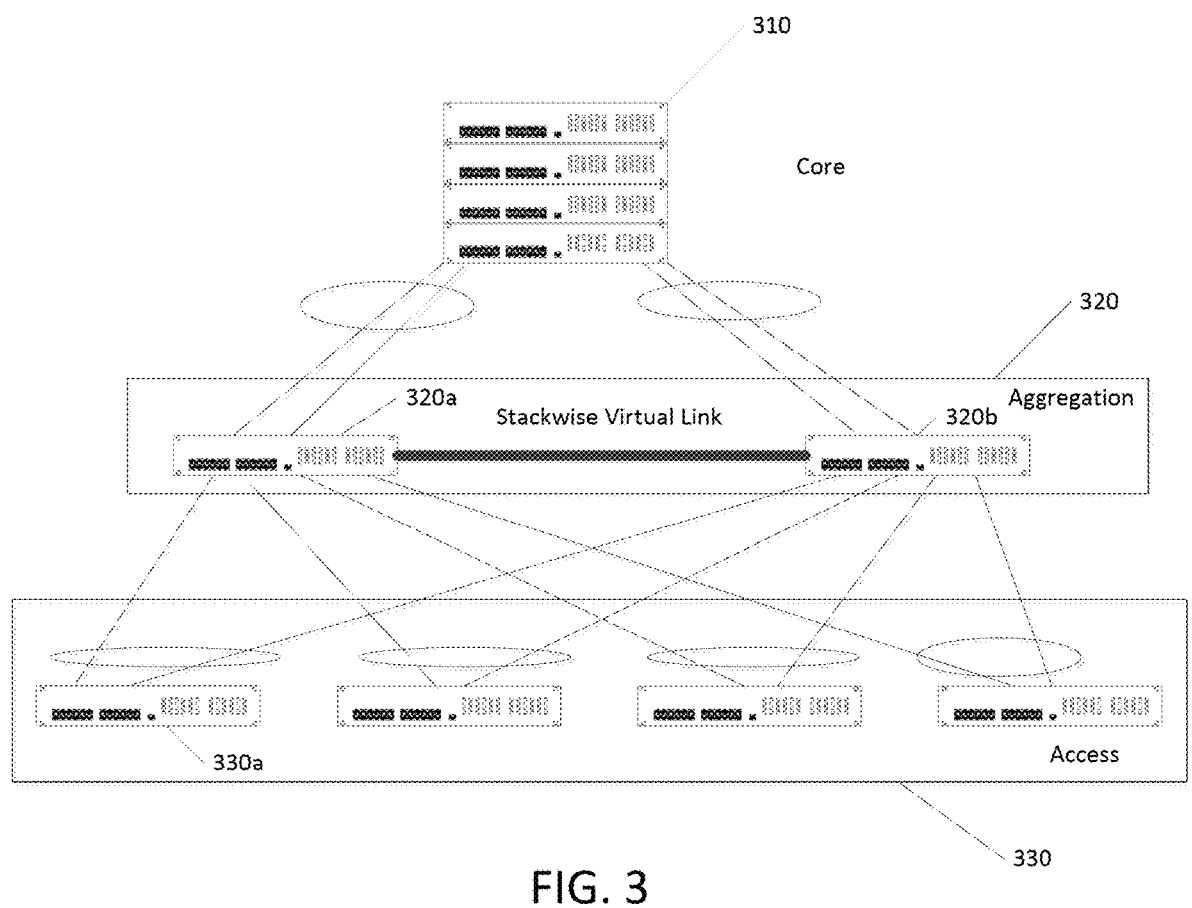
FIG. 3 is a hierarchical network that efficiently load balances traffic from access to core and avoids unnecessary use of links at an aggregation layer consistent with embodiments of the present disclosure.

Stackwise Virtual enables one or more front panel ports to be combined and designated as a stack port, as indicated in the topology shown in FIG. 3. These links are called Stackwise Virtual Links (SVL). In cases where EC hashing decisions are made at egress, as is the case with UADP ASIC, a copy of the traffic that has to hash out to a core or access etherchannel member will be sent across the SVL for the EC hash to be applied. Of these two copies, one will be dropped and the other will be sent. This is not exactly desirable when there is an EC member link on the local switch connected to the core or access. It takes up unnecessary bandwidth, and will sooner rather than later end up oversubscribing the SVL.

Users can choose if they want their traffic to go over a set of local links or work in a regular etherchannel mode. Traffic will be sent over SVL if all local EC members go down. We go through each flows below to highlight the differences.

For unicast traffic, the hash programming for the EC member is done to make sure a local link is available on egress. The egress destination programming will make sure that no packets are sent across the SVL. This is comparable to current frontside stacking implementations.

For multicast and broadcast traffic, the EC is added to the multicast group, and the hash programming is done to make sure a local link is available on egress. However, it is possible that a particular multicast group has non-EC receivers on the remote switch. In this case, the system allows a copy of the packet to go to other end but then make use of hardware pruning to weed out the EC member ports (using a frontside stack drop table). Hardware pruning allows the achievement of local forwarding behavior without having to duplicate egress forwarding resources. This is an important differentiation of this solution over the previous ones—it is much improved, and can now span across network domains (access and aggregation).

Control frames from any Stackwise Virtual member over a remote EC port will not be impacted by the above mechanism since there is a bit in the SVL header to allow override of drop decisions.

The solution proposed above has a faster re-convergence time, and does not require significant processor and memory resources to recalculate and reprogram in the case of a link failure. In addition, this solution can be used for any other protocol or technology requirement mandating redundant links with or without the use of hashing mechanisms, and is thereby extensible as well.

FIG. 1 illustrates an exemplary switch topology of a "ring of rings" type that uses hierarchical etherchannel consistent with embodiments of the present disclosure. Each of the four nodes illustrated is a stack segment; the stack segment is a ring of routers. Through the use of frontside stacking the size and number of stacks may be extended beyond the original stack segment through the use of various topologies such as the illustrated "ring of rings" or "stack of stacks." In this topology, traffic flows on the backside stack within a given stack segment and across the frontside stack for traffic flowing between and among stack segments.

Traffic flowing from Stack Segment 4 140 to Stack Segment 2 120 may flow over hierarchical etherchannel 1 170 that includes etherchannel 1 150 and etherchannel 2 160. So long as both etherchannel 1 150 and etherchannel 2 160 are up and running, a hash is performed on data packets in order to select whether the packet will flow via etherchannel 1 150 or etherchannel 2 160. Thus, hashing can be used as one method of load balancing the system. Once an etherchannel (1 or 2) is selected, the particular link within that etherchannel is also selected based on load balancing that etherchannel link, typically via use of a hash.

Should one of the etherchannels go down, then the address for that etherchannel is masked off and traffic redirected to the healthy etherchannel. Should one of the links within an etherchannel go down, that link is masked and traffic will flow down that etherchannel on the links that are still healthy.

Figure 2:
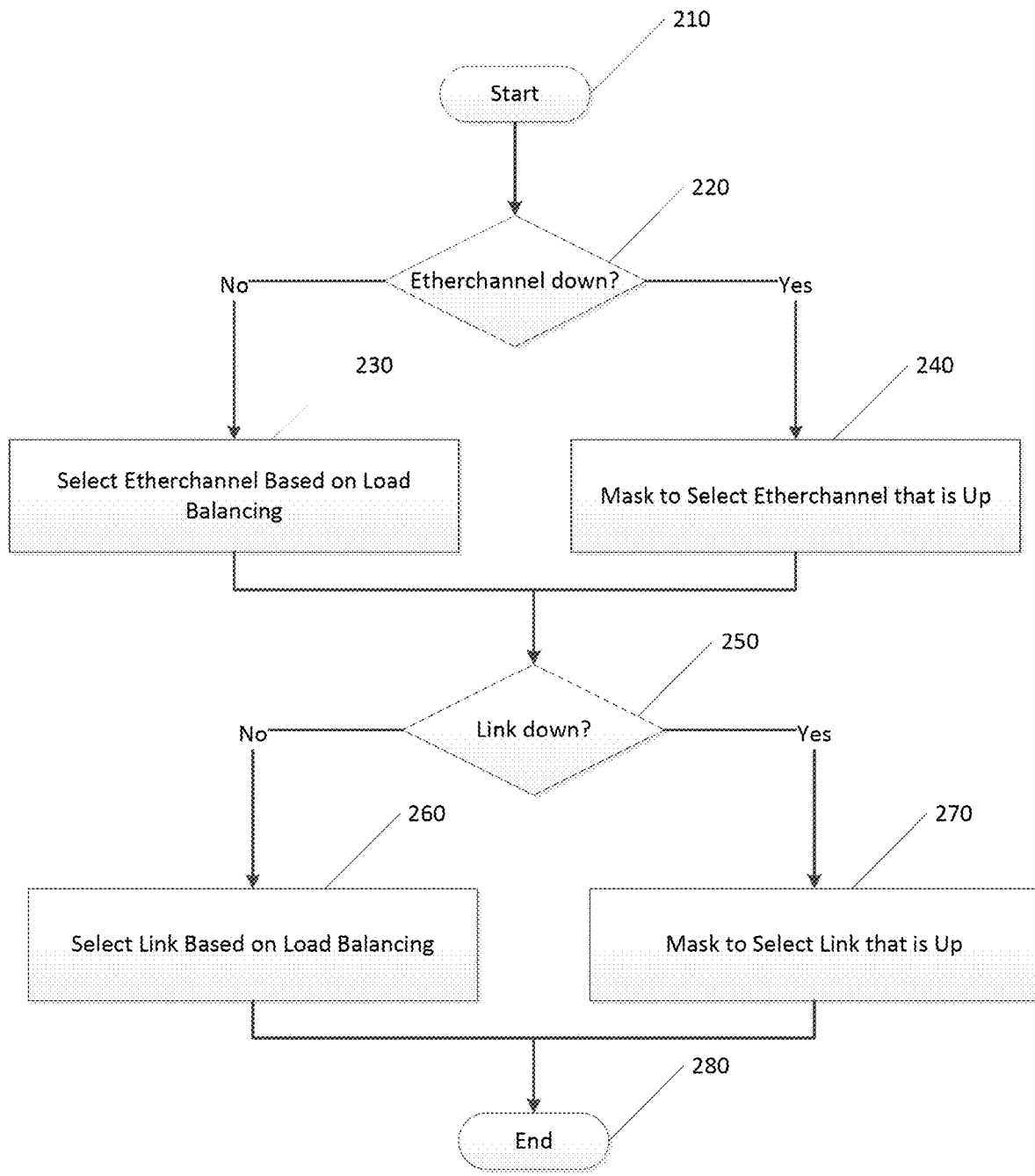
FIG. 2 is a flow chart illustrating packet routing in a topology that uses hierarchical etherchannel, for example, a "ring of rings" topology" consistent with embodiments of the present disclosure.

FIG. 2 is a flow chart illustrating packet routing in a topology that uses hierarchical etherchannel, for example, a "ring of rings" topology" consistent with embodiments of the present disclosure. Flow begins at Start (stage 210) where a packet needs to traverse from a first stack segment to a second stack segment that is at least one segment away. Thus, each packet could flow in one of two directions, where each direction is an etherchannel, and each etherchannel comprises multiple links.

A check is made to see if one of the etherchannels is down (stage 220). If so, then a mask is applied to block out the down etherchannel the healthy etherchannel is selected (stage 240). If no etherchannels are down, an etherchannel that is part of the hierarchical etherchannel is selected for load balancing purposes, typically through the use of a hashing algorithm (stage 230).

Next, a test is made on the selected etherchannel to see if any links are down (stage 250). If so, that link or links is masked off and a link that is active is selected to carry the traffic (stage 270). If not, a link is selected based on load balancing, typically through the use of a hashing algorithm.

So, in summary, typically two hashing are performed: a first to select an etherchannel from among the etherchannels that form the hierarchical etherchannel, and a second to select a link within the selected etherchannel to carry the traffic.

FIG. 3 is a hierarchical network that efficiently load balances traffic from access to core and avoids unnecessary use of links at an aggregation layer consistent with embodiments of the present disclosure. This figure is used to illustrate traffic that flows from the access to the core via an aggregation layer. The aggregation layer is interconnected via Stackwise Virtual Link. Each access node, for example access node 330a, is interconnected via etherchannel to each of the nodes 320a and 320b in the aggregation layer. Each node in the aggregation layer, 320a and 320b, is connected to the core via etherchannel. Links within a given etherchannel are denoted by the ellipse that encompasses the links.

When traffic flows from an access node, such as access node 330a, to the core 310 via the aggregation layer 320, the traffic is initially hashed to select a link within the etherchannel to send the packet through. For example, the hash result of a packet send from access node 330a may result in the packet traveling up the left-most link to aggregation node 320a. From aggregation node 320a to core 310, another hash is performed to select one of the two links in the interconnecting etherchannel upon which to send the packet.

Figure 4:
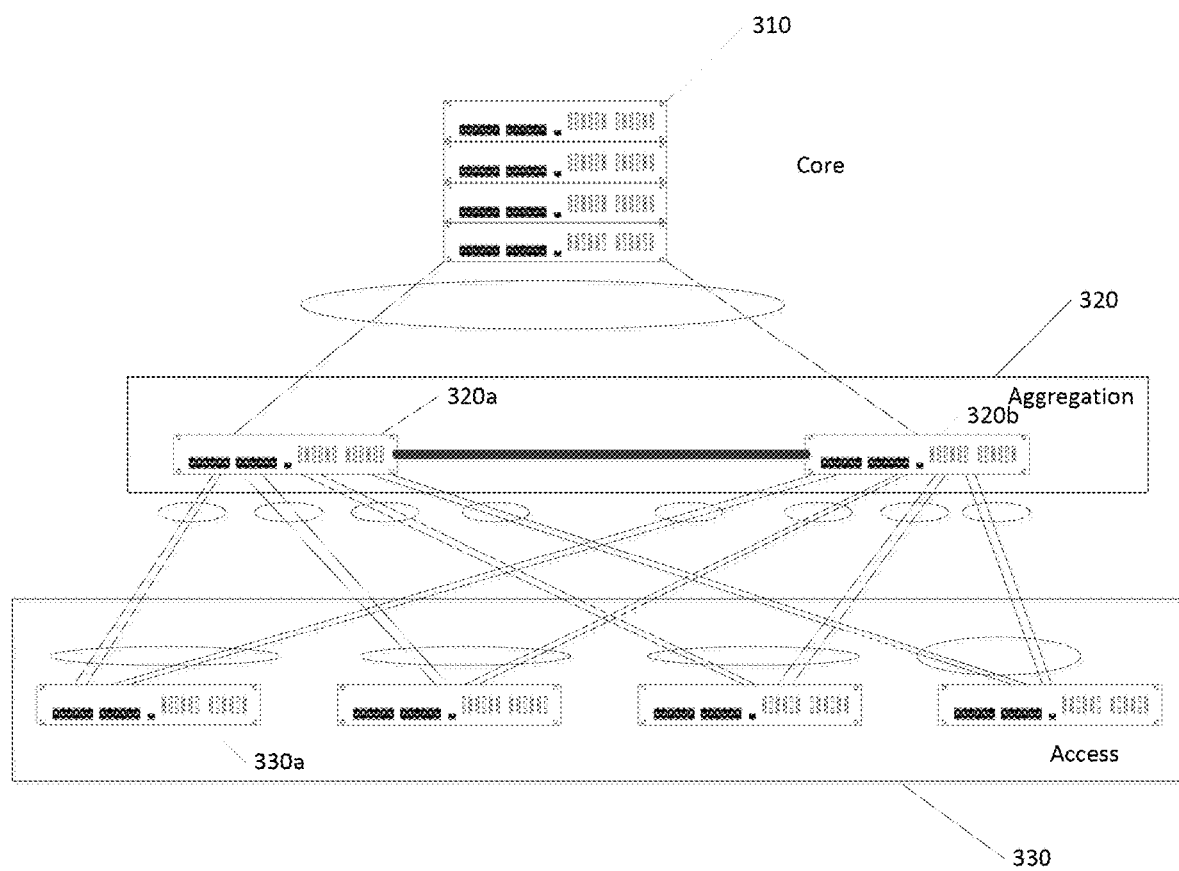
FIG. 4 is a hierarchical network that efficiently load balances traffic from core to access and avoids unnecessary use of links at an aggregation layer consistent with embodiments of the present disclosure.

FIG. 4 is a hierarchical network that efficiently load balances traffic from core to access and avoids unnecessary use of links at an aggregation layer consistent with embodiments of the present disclosure. This figure is used to illustrate traffic that flows from the core to the access via an aggregation layer. The aggregation layer is interconnected via Stackwise Virtual Link. Each access node, for example access node 330a, is interconnected via etherchannel to each of the nodes 320a and 320b in the aggregation layer via an etherchannel link comprising at least two links. Each node in the aggregation layer, 320a and 320b, is connected to the core via etherchannel. Links within a given etherchannel are denoted by the ellipse that encompasses the links.

When traffic flows from the core 310 to an access node via the aggregation layer 320, the traffic is initially hashed to select a link within the etherchannel to send the packet through. For example, the hash result of a packet sent from core 310 may result in the packet traveling up the left-most link to aggregation node 320a. From aggregation node 320a to access node 330a, another hash is performed to select one of the two links in the interconnecting etherchannel upon which to send the packet.

Figure 5A:
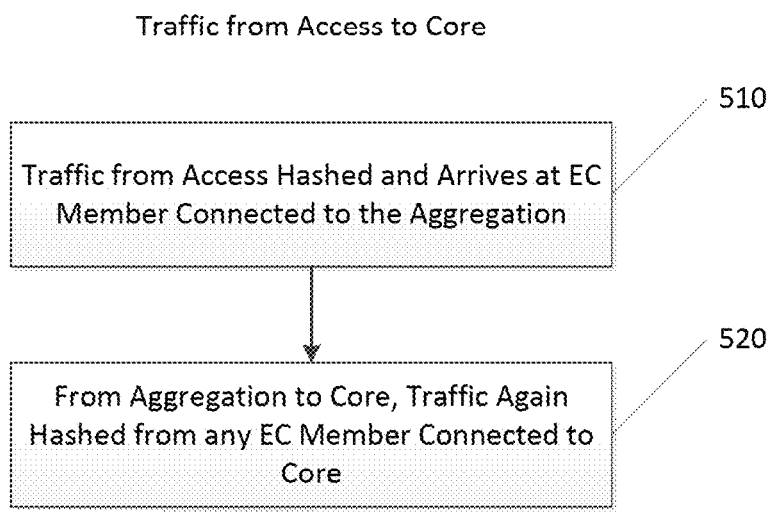
FIG. 5*a* and FIG. 5*b* are flowcharts showing traffic handling in a hierarchical network consistent with embodiments of the present disclosure.
Figure 5B:
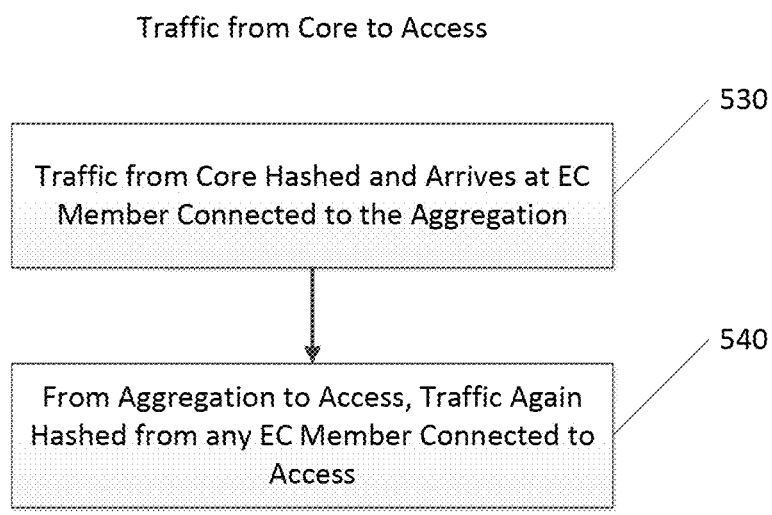

FIG. 5a and FIG. 5b are flowcharts showing traffic handling in a hierarchical network consistent with embodiments of the present disclosure. FIG. 5a is a flowchart showing traffic flow from access to core; while FIG. 5b is a flowchart showing traffic flow from core to access. Beginning with FIG. 5a, traffic from access is load balanced, typically via a hashing algorithm and arrives at an etherchannel member connected to the aggregation layer (stage 510). From the aggregation layer to the core, traffic is again load balanced, or hashed, from any etherchannel member connected to the cored. Turning to FIG. 5b, traffic from the core is load balanced, or hashed, and arrives at an etherchannel member connected to the aggregation layer (stage 530). From the aggregation layer to the access layer, traffic is again load balanced, or hashed, from an etherchannel member connected to access (stage 540).

Figure 6:
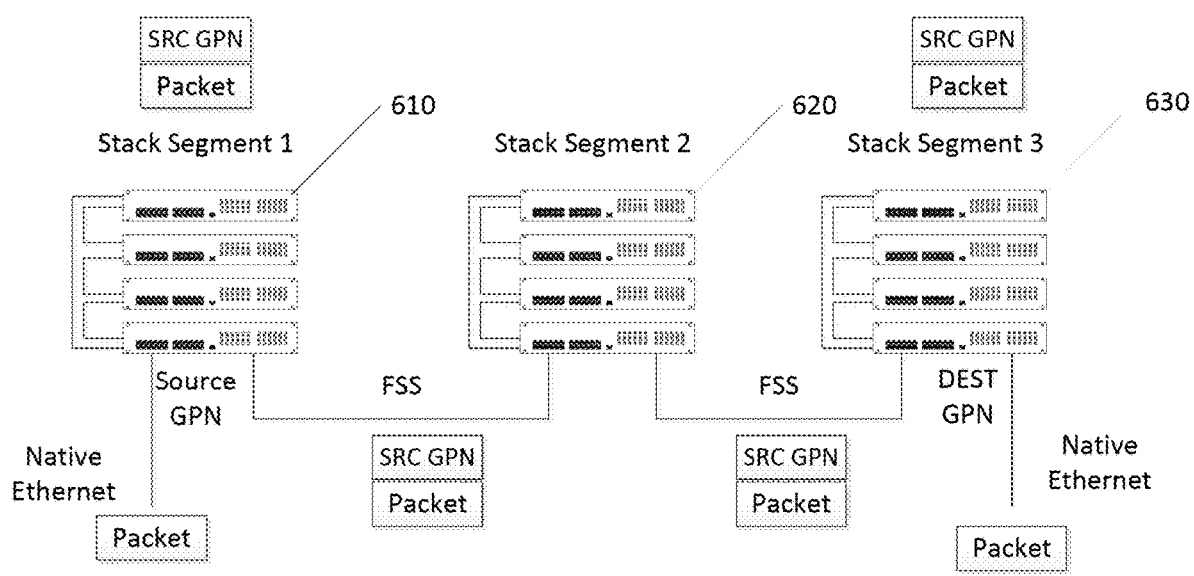
FIG. 6 illustrates a network of stack segments connected with frontside stacking consistent with embodiments of the present disclosure.

FIG. 6 illustrates a network of stack segments connected with frontside stacking consistent with embodiments of the present disclosure. In FIG. 6, stack segment 1 610 is connected to stack segment 2 620 via frontside stacking. Stack segment 2 620 is connected to stack segment 3 630 via frontside stacking. Packets arrive over native Ethernet at a source global port number at stack segment 1 and leave stack segment 3 over native Ethernet at a destination global port number ("GPN"). When a packet arrives at the source global port number, the source GPN is appended to the frame descriptor associated with the packet. The source GPN, as well as the destination GPN, remain with the packet as its flows through the stack of stacks.

In addition, intermediate source GPN and intermediate destination GPN are affixed to the frame descriptor as the packet travels in and out of the various stack segments. Intermediate déjà vu checks are performed using the intermediate source GPN and intermediate destination GPN to make sure that a packet is not being sent out of a port upon which it entered. The source GPN and destination GPN are used at the destination GPN on stack segment 3 630 for a déjà vu check to ensure the packet is not leaving on the same port from which it entered.

Figure 7:
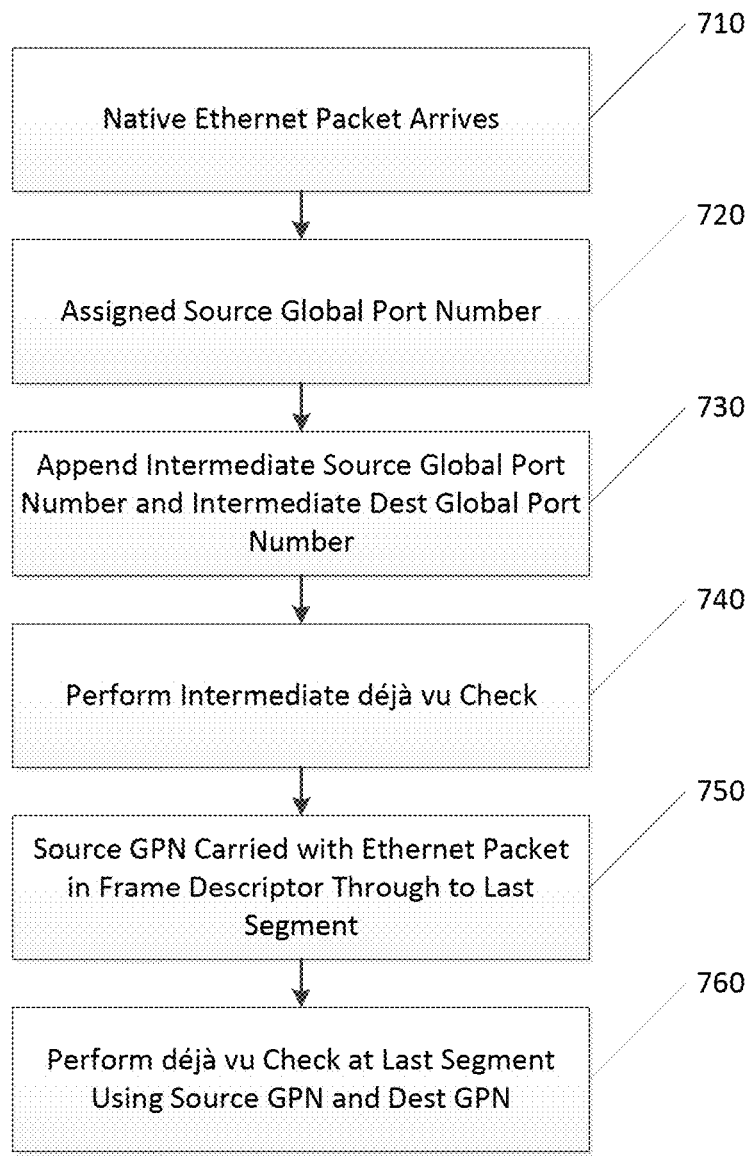
FIG. 7 illustrates a flow chart of traffic flow across the network illustrated in FIG. 6 consistent with embodiments of the present disclosure.

FIG. 7 illustrates a flow chart of traffic flow across the network illustrated in FIG. 6 consistent with embodiments of the present disclosure. Initially, a native Ethernet packet arrives at the source GPN (stage 710). A source GPN and destination GPN are affixed to the frame descriptor that is associated with that packet (stage 720). As the packet travels through the stack of stacks, intermediate source global port numbers and intermediate destination global port numbers are added to the frame descriptor (stage 730). Intermediate déjà vu checks are performed at each stack segment (stage 740). The source GPN is carried with the Ethernet packet in the frame descriptor through to the last stack segment (stage 750). Lastly, a déjà vu check is performed at the last stack segment using the source GPN and the destination GPN (stage 760).

Figure 8:
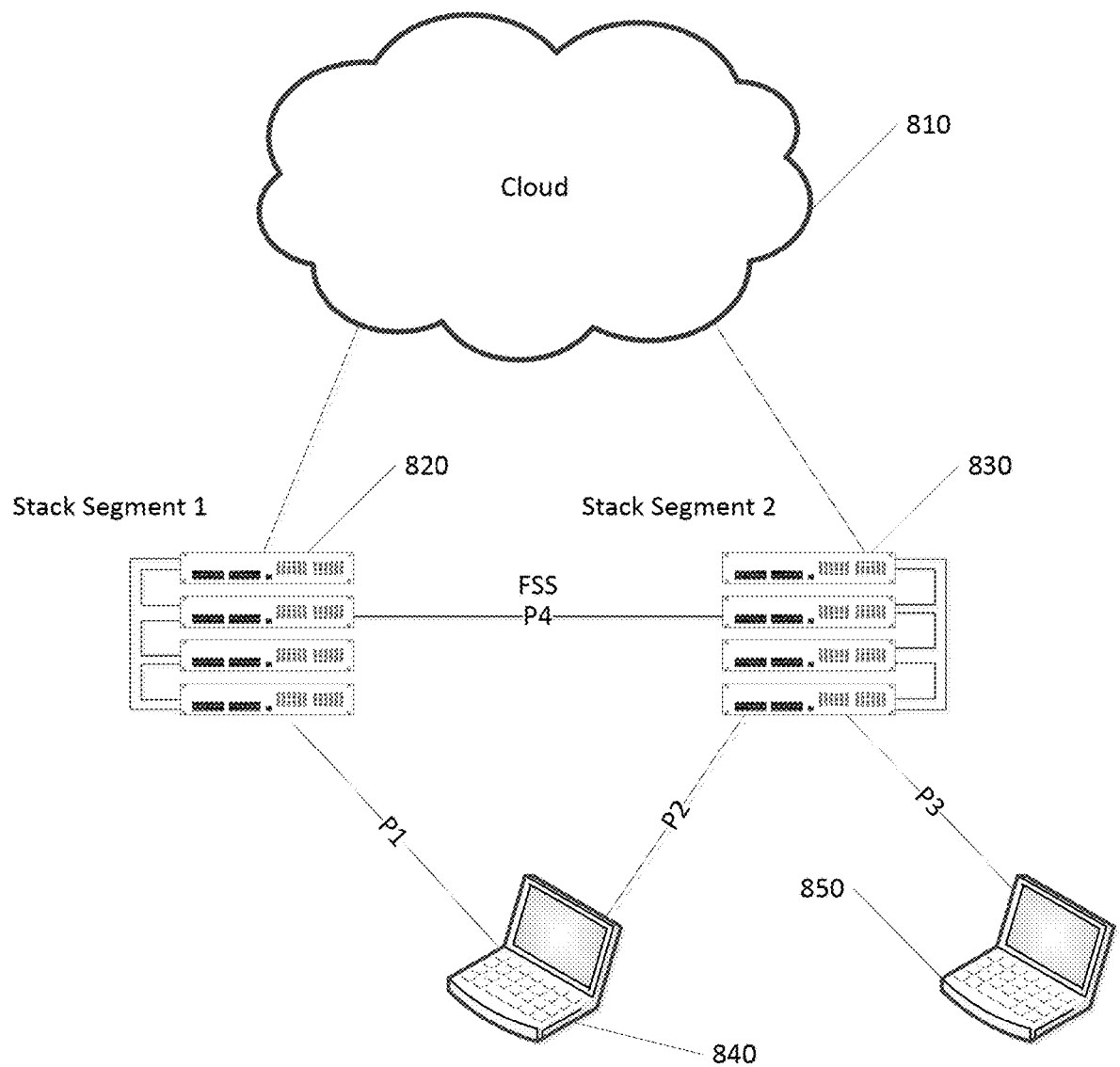
FIG. 8 illustrates a second network of stack segments connected with frontside stacking consistent with embodiments of the present disclosure.

FIG. 8 illustrates a second network of stack segments connected with frontside stacking consistent with embodiments of the present disclosure. In FIG. 8, a plurality of computers 840 and 850 are communicating via a stack of stacks comprising stack segment 1 820 and stack segment 2 830 with the cloud 810. A frontside stack P4 is in communication between stack segment 1 820 and stack segment 2 830. According to the principles of the present disclosure, when communication is made from the cloud to computer 840 via Stack Segment 1 820, communication occurs over link P1, instead of over the longer path via P4 and P2. In this way, intelligent routing is performed that avoid unnecessary hops and traffic.

Any process, descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved. In some embodiments, steps of processes identified in FIGS. 2, 4, and 7 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIGS. 2, 4, and 7 either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the switching systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

We claim:

1. A method, comprising:
    designating a first plurality of links from a first stack segment to a second stack segment as a first etherchannel link;
    designating a second plurality of links from the first stack segment to a third stack segment as a second etherchannel link, where the second stack segment and the third stack segment are in communication with a fourth stack segment;
    designating the first etherchannel link and the second etherchannel link as members of a hierarchical etherchannel link; and
    sending a packet from the first stack segment to the fourth stack segment using the hierarchical etherchannel link wherein sending the packet further comprises;
    determining that the first etherchannel link is down,
    masking out the first etherchannel link in response to determining that the first etherchannel link is down, and
    using the second etherchannel link to send the packet.

2. The method of claim 1, wherein sending a packet further comprises load balancing the hierarchical etherchannel link.

3. The method of claim 2, wherein load balancing the hierarchical etherchannel link comprises hashing the packet to select the first etherchannel link.

4. The method of claim 2, further comprising, when one of the first plurality of links is down, masking out the one of the first plurality of links that is down and utilizing another link within the first plurality of links to send the packet.

5. The method of claim 1, further comprising sending a packet from the first stack segment to the fourth stack segment using the first etherchannel link.

6. The method of claim 5, further comprising load balancing the first etherchannel link.

7. The method of claim 6, wherein load balancing the first etherchannel link comprises selecting one of the first plurality of links based on a hash of the packet.

8. An apparatus comprising:
    a memory storage; and
    a processing unit coupled to the memory storage, wherein the processing unit is operative to:
        designate a first plurality of links from a first stack segment to a second stack segment as a first etherchannel link;
        designate a second plurality of links from the first stack segment to a third stack segment as a second etherchannel link, where the second stack segment and the third stack segment are in communication with a fourth stack segment;
        designate the first etherchannel link and the second etherchannel link as members of a hierarchical etherchannel link; and
        send a packet from the first stack segment to the fourth stack segment using the hierarchical etherchannel link wherein the processing unit being operative to send the packet further comprises the processing unit being operative to;
        determine that the first etherchannel link is down,
        mask out the first etherchannel link in response to determining that the first etherchannel link is down, and
        use the second etherchannel link to send the packet.

9. The apparatus of claim 8, wherein the processing unit being operative to send the packet further comprises the processing unit being operative to load balance the hierarchical etherchannel link.

10. The apparatus of claim 9, wherein the processing unit being operative to load balance the hierarchical etherchannel link comprises the processing unit being operative to hash the packet to select the first etherchannel link.

11. The apparatus of claim 8, wherein the processing unit being further operative to send the packet from the first stack segment to the fourth stack segment using the first etherchannel link.

12. The apparatus of claim 11, wherein the processing unit being further operative to load balance the first etherchannel link.

13. The apparatus of claim 12, wherein the processing unit being operative to load balance the first etherchannel link comprises the processing unit being operative to select one of the first plurality of links based on a hash of the packet.

14. A non-transitory computer-readable medium that stores a set of instructions which when executed perform a method executed by the set of instructions comprising:
    designating a first plurality of links from a first stack segment to a second stack segment as a first etherchannel link;
    designating a second plurality of links from the first stack segment to a third stack segment as a second etherchannel link, where the second stack segment and the third stack segment are in communication with a fourth stack segment;
    designating the first etherchannel link and the second etherchannel link as members of a hierarchical etherchannel link; and
    sending a packet from the first stack segment to the fourth stack segment using the hierarchical etherchannel link, wherein sending the packet further comprises;
    determining that the first etherchannel link is down,
    masking out the first etherchannel link in response to determining that the first etherchannel link is down, and
    using the second etherchannel link to send the packet.

15. The non-transitory computer-readable medium of claim 14, wherein sending a packet further comprises determining whether the first etherchannel link is down.

16. The non-transitory computer-readable medium of claim 15, further comprising, when the first etherchannel link is down, masking out the first etherchannel link and using the second etherchannel link to send the packet.

17. The non-transitory computer-readable medium of claim 15, further comprising, when one of the first plurality of links is down, masking out the one of the first plurality of links that is down and utilizing another link within the first plurality of links to send the packet.

18. The non-transitory computer-readable medium of claim 14, further comprising sending a packet from the first stack segment to the fourth stack segment using the first etherchannel link.

* * * * *